United States Patent

Veilleux, Jr. et al.

[11] Patent Number: 5,806,300
[45] Date of Patent: Sep. 15, 1998

[54] ELECTRONIC CONTROL FOR A VARIABLE DELIVERY, POSITIVE DISPLACEMENT FUEL PUMP

[75] Inventors: Leo J. Veilleux, Jr., Wethersfield; Charles E. Reuter, Granby, both of Conn.

[73] Assignee: United Technologies Corporation, Hartford, Conn.

[21] Appl. No.: 577,770

[22] Filed: Dec. 22, 1995

[51] Int. Cl.⁶ .................................................. F02C 9/28
[52] U.S. Cl. ........................................ 60/39.281; 60/734
[58] Field of Search .............................. 60/39.281, 734

[56] References Cited

U.S. PATENT DOCUMENTS

| | | |
|---|---|---|
| 2,628,472 | 2/1953 | Dray et al. . |
| 2,769,306 | 11/1956 | Harris ................................. 60/39.281 |
| 2,874,765 | 2/1959 | King ................................... 60/39.281 |
| 3,020,890 | 2/1962 | Grad . |
| 3,056,454 | 10/1962 | Basford et al. ..................... 60/39.281 |
| 3,187,504 | 6/1965 | Herbert et al. ..................... 60/39.281 |
| 3,413,806 | 12/1968 | Belke et al. . |
| 3,596,467 | 8/1971 | Avery . |
| 3,618,315 | 11/1971 | Avery . |
| 3,704,588 | 12/1972 | Trabbic . |
| 3,898,795 | 8/1975 | Barker . |
| 3,991,569 | 11/1976 | Smith . |
| 4,875,168 | 10/1989 | Martin . |
| 4,920,942 | 5/1990 | Fujimori et al. . |
| 4,958,494 | 9/1990 | Maki et al. . |
| 4,993,391 | 2/1991 | Kuribara et al. . |
| 5,133,181 | 7/1992 | Moore, Jr. . |

FOREIGN PATENT DOCUMENTS

| | | |
|---|---|---|
| 2389000 | 4/1977 | France . |
| 702410 | 1/1954 | United Kingdom . |

*Primary Examiner*—Louis J. Casaregola
*Attorney, Agent, or Firm*—Richard H. Kosakowski, Esq; Holland & Bonzagni, P.C.

[57] ABSTRACT

An electronic control for a variable delivery, positive displacement fuel pump includes a flow sensor located at the fuel outlet to the engine. The flow sensor provides a signal, indicative of actual fuel flow to the engine, to an electronic engine control. The electronic engine control compares actual fuel flow with desired fuel flow, and upon any difference therebetween commands an electrohydraulic servo valve to position a pump control actuator. The pump control actuator controls the amount of fuel delivered by the pump. Also, fuel flow upstream of the flow sensor is bypassed in a line to another section of the electrohydraulic servo valve. The electronic engine control commands a small amount of fuel to be bypassed back to the pump inlet during normal operating conditions. However, upon the occurrence of a transient condition, the electronic engine control causes more or less fuel to be bypassed back to the pump inlet. In this way, improved transient response of the pump is achieved by the electronic control of the present invention.

15 Claims, 2 Drawing Sheets

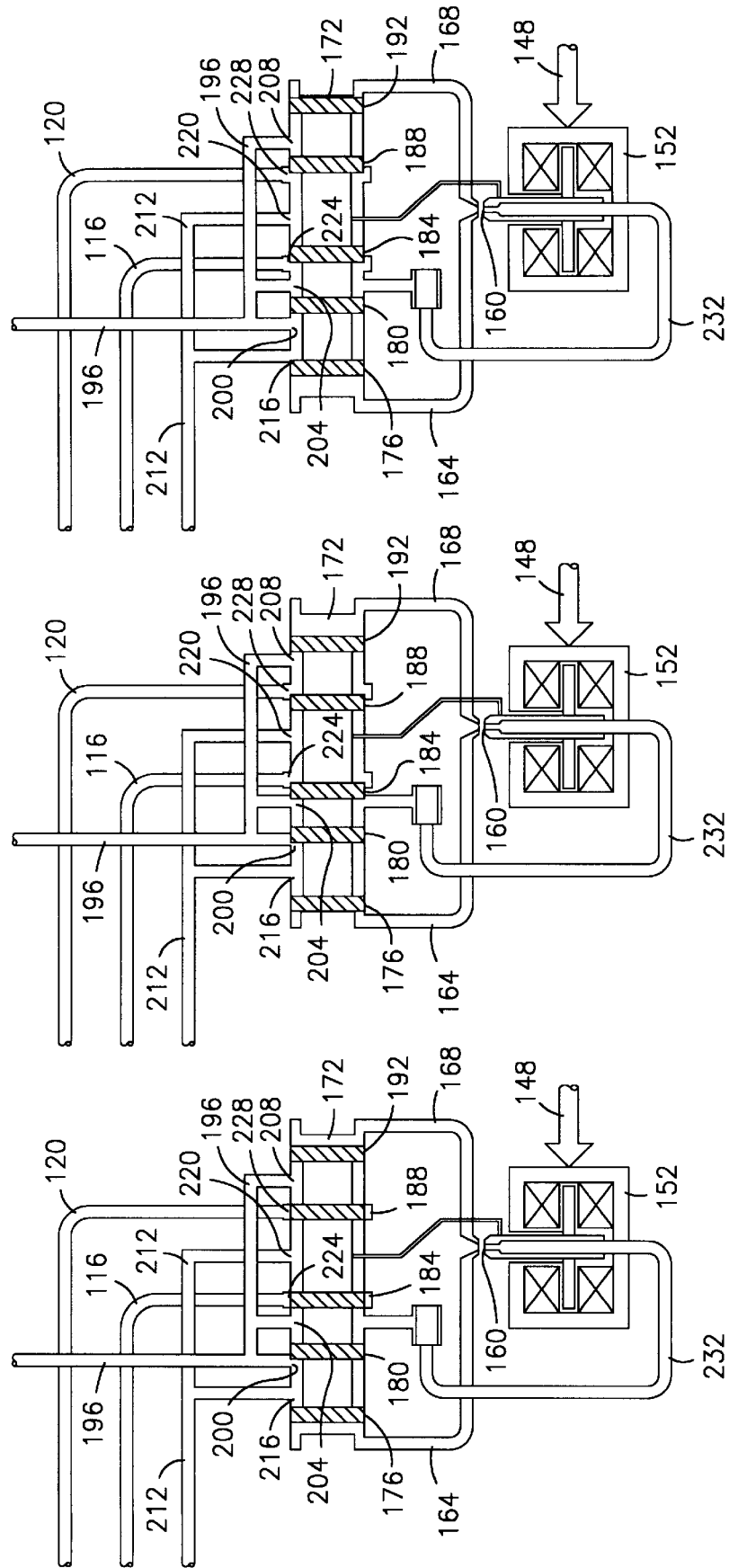

ELECTRONIC CONTROL FOR A VARIABLE DELIVERY, POSITIVE DISPLACEMENT FUEL PUMP

BACKGROUND OF THE INVENTION

This invention relates to the control of a fuel pump, and more particularly to an electronic control for a variable delivery, positive displacement fuel pump for a jet aircraft gas turbine engine.

Fuel pumps for aircraft gas turbine engines have traditionally been fixed delivery, positive displacement type pumps. This type of pump delivers a constant volume of fuel for each cycle of pump operation. Further, this type of pump is normally driven at a fixed delivery ratio relative to engine speed. The critical pump sizing criteria are typically the fuel flow and pressure needed for engine lightoff at cranking speeds (approximately 10 percent of full speed).

However, these pump sizing criteria result in excessive fuel delivery at higher engine speeds and altitudes (i.e., for most of normal engine operation). As a result, actual pump delivery flow in excess of desired or required engine flow is typically bypassed back to the pump inlet. A major problem with this result is that bypass and recirculation of fuel results in significant fuel heating due to the pressurizing of the fuel by the pump and the subsequent pressure drop of the fuel in the bypass line upstream of the pump. The high fuel temperature is also a problem since the fuel is typically used as a heat exchange medium in the engine.

With the latest fuel efficient engine designs, excessive fuel heating becomes a serious problem. Reduced engine fuel consumption is accompanied by increased engine and oil lubrication system temperatures. Excess oil lubrication system heat is normally managed with a combination of fuel/oil and air/oil heat exchangers.

However, heat exchangers are undesirable in this situation because of their associated size, weight and cost. Air/oil coolers are problematic because of the drag penalty they incur on the aircraft. Yet, the cooling burden on an air/oil cooler is decreased with lower fuel temperatures. This is because the lower fuel temperatures permit more lubrication system heat to be directed to the fuel system through the fuel/oil heat exchanger. This can result in a significant reduction in heat exchanger system size, weight and cost, as well as a reduction in the drag penalties associated with the air/oil coolers.

In contrast to fixed delivery pumps, variable delivery, positive displacement fuel pumps have the ability to vary delivery flow, to thereby match engine demands for a wide range of engine speeds and altitudes. Thus, the variable delivery pump eliminates the excessive fuel delivery and resulting heat generation inherent in fixed delivery pumps.

To take full advantage of the variable delivery capabilities of this type of pump, a pump control system is normally required. Further, to be an effective control system, accurate, uninterrupted scheduling of fuel flow to the engine is necessary at all engine operating conditions. These operating conditions typically include rapid and sudden disturbances in pump fuel flow, including those caused by the slewing of fuel powered engine actuators.

One known prior art method of pump flow control is to position a variable area orifice (i.e., a metering window) in the pump flow path. A constant pressure drop is maintained across the metering window by varying pump displacement. This constant pressure drop across the metering window insures that the correct scheduled fuel flow is supplied to the engine.

In this type of control scheme, pump displacement is typically altered by an actuator driven by a pilot valve. The spring biased pilot valve senses pressure both upstream and downstream of the metering window. As pump flow conditions change, a different metering valve pressure drop is sensed by the pilot valve. In response, the pilot valve translates and moves the pilot valve windows from their null position. This causes the pump actuator to stroke, thereby varying pump displacement until the desired and constant metering valve pressure drop is restored.

However, a problem with this pressure drop control scheme is its inability to quickly and adequately respond to sudden disturbances in flow. This scheme usually does not provide for a fast responding proportional control of fuel flow. The bandwidth of this pressure drop control is limited by the dynamic response of the pump actuator servo system. If the servo system response could be improved, the control system bandwidth could increase. However, the increase in control system bandwidth is limited by the requirements for control stability at all operating conditions.

A second inherent drawback in the pressure drop control scheme is its sensitivity to pump servo friction. A pump control actuator inherently has a relatively large amount of friction. Friction causes a flow scheduling deadband which can lead to inaccuracies and instability.

In the alternative, flow control for a variable displacement, fixed delivery pump may be carried out electronically with a microprocessor. The microprocessor detects pump fuel flow to the engine via a flow sensor located in the engine fuel flow delivery line. The microprocessor software compares actual flow with desired flow and, upon any difference therebetween, the microprocessor varies pump displacement by positioning a pump servo system via an electromechanical interface device (such as an electrohydraulic servo valve) until commanded flow matches delivered flow.

A benefit of the flow sensor and microprocessor approach is that a variable or fixed metering window with a fixed regulated pressure drop is not required. Elimination of this pressure drop across the metering window reduces the total system pressure drop. This reduces the maximum working pressures at maximum fuel flow conditions, as well as reduces required pump head at starting conditions. In addition, control gains as well as engine flow schedules can be easily altered electronically through software, rather than by a hardware implementation.

However, meeting control system dynamic response requirements can be a problem with the above described electronic control approach., For example, the bandwidth of the system is limited by the dynamic response of the pump actuator servo system. In addition, the electronic control scheme exhibits the same sensitivity to pump servo friction as the pressure drop regulation scheme. Thus, the prior art electronic control schemes are approximately similar to the prior art pressure drop control schemes in their inability to adequately respond to sudden disturbances in the flow.

Accordingly, it is a primary object of the present invention to provide an electronic control system for a variable delivery, positive displacement fuel pump.

It is a general object of the present invention to provide the electronic control system that achieves quick, accurate and uninterrupted dynamic response to external flow disturbances.

It is another object of the present invention to provide the electronic control system that exhibits relatively reduced sensitivity to pump servo friction.

It is yet another object of the present invention to provide the electronic control system that utilizes a bypass flow line, but with significantly less heat generation compared to a prior art bypass line for a fixed delivery, positive displacement fuel pump.

It is still another object of the present invention to provide the electronic control system that provides for a controlled proportional bypass flow.

It is yet another object of the present invention to provide the electronic control system that closely schedules pump fuel flow to match engine flow demands at all engine operating conditions.

It is another object of the present invention to provide the electronic control system that eliminates the need for a variable area metering window and its corresponding pressure drop and the inherent problems with such a system.

It is yet another object of the present invention to provide the electronic control system that provides for flexibility in altering fuel flow schedules and control gains through software rather than hardware.

It is another object of the present invention to provide the electronic control system that provides for improved transient response and steady-state accuracy through use of a controlled fuel bypass loop from the pump outlet back to the pump inlet.

The above and other objects and advantages of this invention will be come more readily apparent when the following description is read in conjunction with the accompanying drawings.

SUMMARY OF THE INVENTION

To overcome the deficiencies of the prior art and to achieve the objects listed above, the applicants have invented an electronic control system for a variable delivery, positive displacement fuel pump for a jet aircraft gas turbine engine.

In a preferred embodiment, fuel flow output from the pump enters a fuel metering unit and initially encounters a flow sensor. Fuel flow from the pump to the engine is monitored through the flow sensor by an electronic engine control. The electronic engine control compares actual fuel flow as sensed by the flow sensor to desired fuel flow and any difference causes the electronic engine control to command an electrohydraulic servo valve to move its pilot valve from its null window position. Any difference is typically caused by a change in engine operating conditions. The windows control pump displacement and delivery by porting high pressure hydraulic fluid to one side of the pump control actuator and simultaneously porting low pressure hydraulic fluid to the opposite side of the pump control actuator. This upsets the force balance on the pump control actuator, and causes the pump control actuator to move in a direction to either increase or decrease pump displacement and flow. When pump displacement has been altered sufficiently to restore a desired pump fuel flow, the electronic engine control returns the electrohydraulic servo valve pilot valve windows to their null position, and the pump actuator stops slewing.

Simultaneously, a proportional bypass loop (formed by fuel from the pump outlet passed through the electrohydraulic servo valve and back to the pump inlet) is controlled by the electrohydraulic servo valve and addresses the response and accuracy limitations of the prior art. The electrohydraulic servo valve has the ability to allow the system to respond very rapidly to sudden disturbances in scheduled fuel flow by varying the flow through the bypass loop. In this way, the electronic control system exhibits the same excellent response and accuracy of a conventional bypass loop found in a fixed delivery, positive displacement fuel pump. However, unlike such a prior art system, the electronic control of the present invention varies pump displacement to reduce heat generation. Heat generation is reduced because the steady-state bypass flow is only that amount which is required to obtain the desired steady-state accuracy in transient response. This value is small relative to the bypass flow that results due to the mismatch between pump outflow and flow demand in a fixed displacement pump metering system. Since the electrohydraulic servo valve always returns to its null position in steady-state, bypass flow varies only as a function of pump discharge pressure. The result is a relatively constant value of bypass fuel flow at all operating conditions.

BRIEF DESCRIPTION OF THE DRAWINGS

FIG. 2 is a schematic illustration, partly in cross section, of the electrohydraulic servo valve of the control system of FIG. 1, the electrohydraulic servo valve being shown in a steady-state condition;

FIG. 3 is a schematic illustration, partly in cross section, of the electrohydraulic servo valve of FIG. 2 shown in an increasing transient condition; and FIG. 4 is a schematic illustration, partly in cross section, of the electrohydraulic servo valve of FIGS. 2 and 3 shown in a decreasing transient condition.

DETAILED DESCRIPTION OF THE PREFERRED EMBODIMENTS

Figure 1:
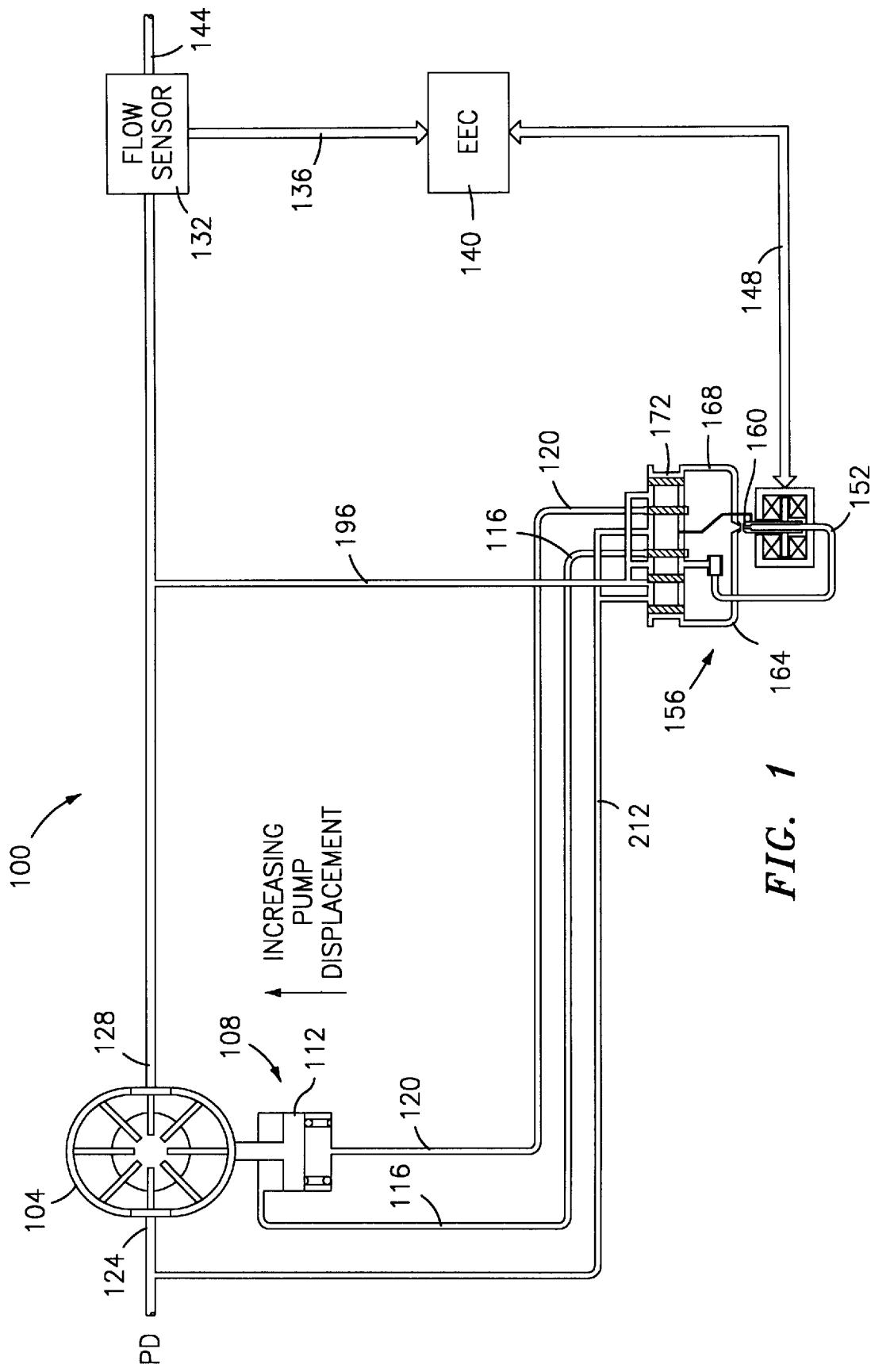
FIG. 1 is a schematic illustration of a variable delivery, positive displacement fuel pump together with an electronic control system in accordance with the present invention.

Referring to the drawings in detail, there illustrated is a control system 100 for a variable delivery, positive displacement pump 104 used to provide fuel for a jet aircraft engine (not shown). Associated with the pump 104 is a pump control actuator 108 that comprises a spring-loaded, moveable element or piston 112 that has hydraulic fluids of predetermined pressures placed onto either side of the piston 112. The fluids are provided in corresponding hydraulic lines 116, 120 from the control system 100. Further associated with the pump 104 is a hydraulic line at the pump inlet 124. This inlet 124 may be connected to a source of fuel (not shown). The pump 104 also has an outlet 128 connected with the corresponding hydraulic line that carries fuel from the pump outlet 124 to the control system 100. The pump and its associated control actuator 108 are commercially available. For usage with a jet aircraft engine, the variable delivery pump may be required to pump fuel in the range of between two hundred and thirty-five thousand pounds per hour; that is, over a wide flow range of 175 to 1.

The fuel flow from the pump outlet 128 is connected with a flow sensor 132 that is a part of a fuel metering unit. The flow sensor 132 senses the amount of fuel in the line from the pump outlet 128 and provides a signal on an electrical signal line 136 indicative of the actual fuel flow at the pump outlet 128. This signal is connected with an electronic engine control ("EEC") 140. The EEC 140 is typically microprocessor-based, and executes software to control the various elements of the control system 100 in accordance with the present invention. The output of the flow sensor on a hydraulic line 144 may typically then be fed to the jet aircraft engine (not shown).

Also connected via electrical signal lines 148 to the EEC 140 is a torque motor 152 that forms a part of an electro-hydraulic servo valve ("EHSV") 156. The EHSV 156 also contains a pilot valve 160 having a moveable element or flapper whose displacement is controlled by the torque motor 152. The pilot valve controls the application of hydraulic fluids in corresponding hydraulic lines 164, 168 that are connected to corresponding ends of a linearly-moveable spool 172 of the EHSV 156. In a preferred embodiment, the spool includes five lands 176-192 that define various openings therebetween in the spool 172.

A first portion of a hydraulic bypass line 196 is connected between the pump outlet 128 and the flow sensor 132. This portion of the bypass line 196 connects to three different windows 200, 204, 208 formed in the spool. A second portion of the bypass line 212 is connected to two other windows 216, 220 of the spool. The upper side of the piston 112 of the pump control actuator 108 has its hydraulic line 116 connected to a window 224 of the spool 172. The lower side of the piston 112 has its hydraulic line 120 connected to a window 228 of the spool 172.

Referring now to FIG. 2, there illustrated is a steady-state position of the spool 172. In this position, pump flow at the pump outlet 128 is approximately at a constant, predetermined value. The spool 172 is positioned such that a small amount of fuel in the first portion of the bypass line 196 flows into the window 200 and out of the window 216 and into the second portion of the bypass line 212 back to the pump inlet 124. Also, in this steady-state position, the land 184 completely blocks the window 224, thereby preventing the flow of any fuel into the hydraulic line 116 back to the top of the piston 112 of the pump control actuator 108. Likewise, the land 188 completely blocks the window 228, thereby preventing any fuel from flowing into the hydraulic line 120 to the lower side of the piston 112 of the pump control actuator 108. Thus, it can be seen from the foregoing that the control system 100 of the present invention provides, during a steady-state condition, for a relatively small and constant amount of fuel from the pump outlet 128 to be bypassed back to the pump inlet 124 through the EHSV 156. Also, the piston 112 of the pump control actuator 108 is held in a constant position by the appropriate hydraulic fluid pressures in the lines 116, 120.

Note that the hydraulic fluid provided in the hydraulic lines 164, 168 to either end of the spool 172 is the fuel in the first portion of the bypass line 196 that is connected to the window 204 of the spool and through a hydraulic line 232 back through the torque motor and to the pilot valve 160.

FIG. 3 illustrates the position of the EHSV 156 during a condition of commanded flow by the EEC 140 exceeding flow detected by the flow sensor 132. Now, the difference between the actual and desired fuel flows causes the EEC to command the torque motor 152 to move its pilot valve 160 to adjust the placement of the spool 172 to essentially move the piston 112 of the pump control actuator 108 in the direction to restore the fuel flow at the pump outlet 128 to a desired amount.

In FIG. 3, the spool 172 has moved slightly towards the left such that now there still exists a flow of fuel in the first portion of the bypass line 196 through the windows 200, 216 and into the second portion of the bypass line 212 back to the pump inlet 124. However, as can be seen in FIG. 3, the size of the opening of the window 200 is somewhat reduced with respect to that in FIG. 2. Thus, the amount of fuel bypassed back to the pump inlet is reduced in this increasing transient condition.

Also in this increasing transient condition, movement of the spool 172 to the left now uncovers the window 228, which allows fuel in the first portion of the bypass line 196 to enter the spool through the window 208 and exit the window 228 and into the line 120 to the lower portion of piston 112 of the pump control actuator 108. Likewise, window 224 is now also uncovered which allows hydraulic fluid in the line 116 from the upper portion of the piston 112 of the pump control actuator to flow through the window 220 back through the second portion of the bypass line 212 and to the pump inlet 124. This now causes a force imbalance on the piston 112 of the pump control actuator 108, thereby causing movement of the piston to thereby cause a change in the displacement of the pump 104. This change in pump displacement causes an increase in the amount of fuel provided by the pump at the pump outlet 128. The fuel amount at the pump outlet 128 is changed until the flow sensor 132 detects the actual fuel flow that matches the desired fuel flow as commanded by the EEC 140.

Referring now to FIG. 4, there illustrated is the position of the spool 172 of the EHSV 156 during a condition of flow detected by the flow sensor exceeding commanded flow. The spool 172 now moves towards the right such that the fuel in the first portion of the bypass line 196 enters the window 200 and exits the window 216 and flows into the second portion of the bypass line 212 back to the pump inlet 124. Also, the windows 204 and 224 are uncovered such that fuel in the first portion of the bypass line 196 flows into hydraulic line 116 to the top of the piston 112 of the pump control actuator 108. Likewise, the windows 228 and 220 are uncovered such that the hydraulic fluid in the line 120 can flow into the second portion of the bypass line 212 and back to the pump inlet 124. This causes a force imbalance on the piston 112 of the pump control actuator 108 such that the piston 112 moves downward, thereby changing the displacement of the pump 104 to ultimately reduce the amount of fuel at the pump outlet 128.

It can be seen from the foregoing that for both steady-state conditions and various transient conditions, there is always some amount of fuel from the pump outlet 128 bypassed back to the pump inlet 124. However, compared to the aforementioned wide range of fuel provided by the pump outlet, the present invention only allows for bypass flow to vary between approximately 1,000 and 2,000 pounds per hour. This relatively small amount of proportional bypass flow, in turn, only causes an approximate 4° F. rise in temperature of the fuel, as compared to approximate 150° F. rise in temperature with the aforementioned prior art bypass systems associated with fixed delivery pumps. This is one improvement over the prior art that the control system 100 of the present invention has. A significant improvement over the aforementioned variable displacement prior art is that the proportional bypass flow from the pump outlet 128 back to the pump inlet 124 allows for greatly improved dynamic response of the control system 100 to transient conditions.

It should be understood by those skilled in the art that obvious structural modifications can be made without departing from the spirit of the invention. Accordingly, reference should be made primarily to the accompanying claims, rather then the foregoing specification, to determine the scope of the invention.

Having thus described the invention, what is claimed is:
1. A control system for providing a controlled amount of fuel to an engine, comprising:
 a variable delivery pump having an inlet and an outlet, the pump being operable to provide fuel at a predetermined quantity at the pump outlet;

a bypass line having a first portion connected with the pump outlet having a second portion connected with the pump inlet, fuel from the pump outlet being operable to flow through the bypass line back to the pump inlet;

an electrohydraulic servo valve having an orifice with a variable opening, the orifice being disposed in the bypass line between the first and second portions of the bypass line between the pump outlet and the pump inlet, the electrohydraulic servo valve being responsive to a control signal for controlling the amount of fuel in the second portion of the bypass line fed to the pump inlet by varying an amount of the variable opening in the orifice, wherein during both a steady-state condition and a transient condition the electrohydraulic servo valve is operable to control the variable opening in the orifice to allow fuel to flow in the second portion of the bypass line back to the pump inlet thereby facilitating response of the control system at engine operating conditions;

sensing means, connected with the pump outlet, for sensing an amount of fuel to the engine and for providing a sensed signal indicative thereof; and signal processing means, responsive to the sensed signal, for providing a desired signal indicative of a desired amount of fuel flow to the engine, for comparing the sensed signal with the desired signal and for providing the control signal to the electrohydraulic servo valve, the control signal being indicative of any difference between the sensed signal and the desired signal.

2. The control system of claim 1, further comprising a pump control actuator operable to control the displacement of the pump to thereby control the amount of fuel delivered by the pump at the pump outlet, the pump control actuator having a moveable element whose position controls the displacement of the pump, a first side of the moveable element having hydraulic fluid in a first line being fed thereto, a second side of the moveable element having hydraulic fluid in a second line being fed thereto.

3. The control system of claim 2, wherein the electrohydraulic servo valve comprises means for controlling the application of the hydraulic fluids to the first and second sides of the moveable element, during a steady-state condition the electrohydraulic servo valve being operable to keep constant the position of the moveable element thereby keeping constant the amount of fuel provided by the pump at the pump outlet, during a transient condition the electrohydraulic servo valve being operable to control the application of the hydraulic fluids to the first and second sides of the moveable element to cause the moveable element to move in the direction to cause a displacement of the pump to vary the amount of fuel provided by the pump at the pump outlet.

4. The control system of claim 3, wherein the means for controlling comprises a moveable spool and a plurality of windows formed in the electrohydraulic servo valve, the means for controlling comprising means for controlling, during the steady-state and transient conditions, movement of the moveable spool to connect the first and second lines to the appropriate first and second portions of the bypass line.

5. The control system of claim 1, wherein the electrohydraulic servo valve comprises a moveable spool, a pilot valve and a torque motor, the moveable spool having a hydraulic fluid applied to both ends of the moveable spool, the torque motor being responsive to the control signal for moving the pilot valve to control the application of the hydraulic fluid to both ends of the moveable spool.

6. The control system of claim 5, wherein the hydraulic fluid applied to both ends of the moveable spool is the fuel in the first portion of the bypass line.

7. The control system of claim 5, wherein the moveable spool is linearly moveable.

8. The control system of claim 1, wherein during a steady-state condition the electrohydraulic servo valve is operable to control the variable opening in the orifice to allow a predetermined amount of fuel to flow in the second portion of the bypass line back to the pump inlet, and wherein during the transient condition the electrohydraulic servo valve is operable to control the variable opening in the orifice to allow an amount of fuel to flow in the second portion of the bypass line back to the pump inlet.

9. The control system of claim 8, wherein the amount of fuel that flows in the second portion of the bypass line during the transient condition is different than the predetermined amount of fuel that flows in the bypass line during the steady-state condition.

10. A control system for controlling an amount of fuel provided by a variable delivery pump to an engine, the pump having an inlet and having an associated pump control actuator for varying the displacement of the pump to thereby vary the amount of fuel provided by the pump at a pump outlet, the control system comprising:

a bypass line having a first portion connected with a pump outlet and having a second portion connected with a pump inlet, fuel from the pump outlet being operable to flow through the bypass line back to the pump inlet; and an electrohydraulic servo valve having an orifice with a variable opening, the orifice being disposed in the bypass line between the first and second portions of the bypass line between the pump outlet and the pump inlet, the electrohydraulic servo valve being responsive to a control signal for controlling the amount of fuel in the second portion of the bypass line fed to the pump inlet by varying an amount of the variable opening in the orifice, wherein during both a steady-state condition and a transient condition the electrohydraulic servo valve is operable to control the variable opening in the orifice to allow fuel to flow in the second portion of the bypass line back to the pump inlet thereby facilitating response of the control system at engine operating conditions, wherein during a steady-state condition the electrohydraulic servo valve comprises means for holding constant a position of the pump control actuator to thereby hold constant the amount of fuel provided by the pump at the pump outlet, and wherein during a transient condition the electrohydraulic servo valve comprises means for varying the position of the pump control actuator to thereby vary the amount of fuel provided by the pump at the pump outlet.

11. The control system of claim 10, wherein during a steady-state condition the electrohydraulic servo valve is operable to control the variable opening in the orifice to allow a predetermined amount of fuel to flow in the second portion of the bypass line back to the pump inlet, and wherein during a transient condition the electrohydraulic servo valve is operable to control the variable opening in the orifice to allow an amount of fuel to flow in the second portion of the bypass line back to the pump inlet.

12. The control system of claim 11, wherein the amount of fuel that flows in the second portion of the bypass line during the transient condition is different than the predetermined amount of fuel that flows in the bypass line during the steady-state condition.

13. The control system of claim 10, wherein the electro-hydraulic servo valve comprises a moveable spool, a pilot valve and a torque motor, the moveable spool having a hydraulic fluid applied to both ends of the moveable spool, the torque motor being responsive to the control signal for moving the pilot valve to control the application of the hydraulic fluid to both ends of the moveable spool.

14. The control system of claim 13, wherein the hydraulic fluid applied to both ends of the moveable spool is the fuel in the first portion of the bypass line.

15. The control system of claim 13, wherein the moveable spool is linearly moveable.

* * * * *